July 22, 1969

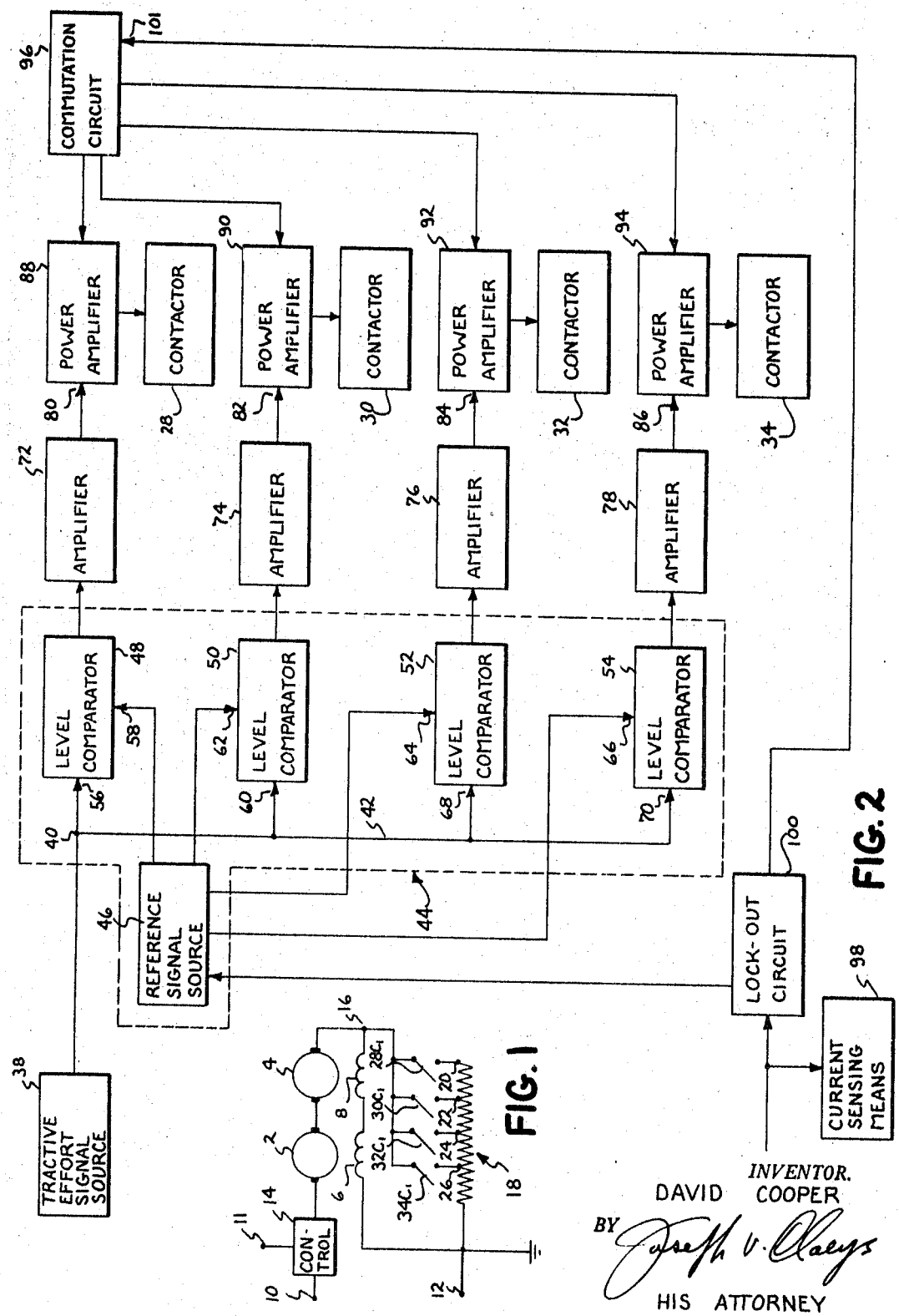

D. COOPER 3,457,487

STATIC FIELD SHUNT CONTACTOR CONTROL

Filed Aug. 17, 1966

INVENTOR.
DAVID COOPER
BY *Joseph V. Claeys*
HIS ATTORNEY

United States Patent Office 3,457,487
Patented July 22, 1969

3,457,487
STATIC FIELD SHUNT CONTACTOR CONTROL
David Cooper, Erie, Pa., assignor to General Electric Company, a corporation of New York
Filed Aug. 17, 1966, Ser. No. 573,088
Int. Cl. H02p 5/06; H02k 27/20
U.S. Cl. 318—332
7 Claims

ABSTRACT OF THE DISCLOSURE

A system for varying the field strength of a motor by sequentially actuating a plurality of contactors to shunt the motor field winding in response to an analog signal varying with tractive effort. Each contactor is actuated when the analog signal exceeds the magnitude of a predetermined reference signal associated with that contactor. Each contactor is actuated in response to a gate signal provided by an associated comparator. A reference signal source provides reference signals of different magnitude to a first input of each comparator and the analog signal is applied to the second input of each comparator.

---

This invention relates to a system for controlling the field strength of electric motors, and more particularly, to a system for controlling the field strength of traction motors of the type used in rapid transit and other railroad vehicle propulsion systems in response to low level electrical signals.

While this invention is capable of a variety of applications, it is particularly useful in automatic vehicle control systems. For example, recent emphasis on high speed, high performance urban rapid transit and railway systems has begun to tax the capabilities of traditional human operators of rapid transit and other railway vehicles. The increasing complexities involved in operating these systems at full capacity, while still providing stringent safety requirements necessary for human passengers, emphasize the growing need for safe, fully automatic operation of the systems.

In answer to this need, recent developments have employed vehicle-carried apparatus for automatically operating rapid transit or other railway vehicles in accordance with received command signals. The command signals may be transmitted from wayside and may be selected in accordance with local track and traffic conditions, or these signals may be transmitted in accordance with traffic conditions only, depending on the type of vehicle separation employed. An automatic control system for vehicles is disclosed and claimed in patent application Ser. No. 418,132, filed Dec. 14, 1964, and assigned to the assignee of the present invention.

The above-identified system includes speed-distance control means which calculates the different propulsion and braking efforts needed for automatic vehicle operation. To this end, means are provided for establishing specific electrical speed and/or distance reference signals derived from electrical command signals received from wayside. By comparison of the reference speed signal with an electrical signal proportional to the actual speed of the vehicle a speed-error signal is derived. Means are further provided for generating open-loop speed signals, in response to the received signals, which schedule vehicle propulsion or braking effort to maintain the reference speed under nominal conditions. Means are also provided for causing the propulsion or braking effort applied to the vehicle to be modulated about the open-loop signal level to maintain the reference speed under actual operating conditions.

The system also includes means actuated by a received wayside signal for generating a preselected speed-distance program signal. These means also generate a signal representing the actual distance of the vehicle to a desired stopping point. The comparison of the last two signals produces a distance-error signal. Means are further provided for generating an open-loop braking rate signal adapted to schedule vehicle braking effort to stop the vehicle at the desired point under nominal conditions. Means are also provided to cause the propulsion or braking effort applied to the vehicle to be modulated about the open-loop level to effect stopping of the vehicle at the desired point under actual operating conditions.

The above-described system is merely an example of the type in which the present invention is useful. These systems require some means for varying the field strength during the normal speed control of vehicle-propelling traction motors in response to electrical signals. In prior speed control systems, the shunting of motor fields takes place during initial power application and during the operation at the highest motor speed. This shunting is accomplished by means of contactors actuated by a motor-operated cam controller. This field weakening must be restrained when motor armature current increases above a prescribed level. Thus a current-limited progression through the various motor field strengths is derived from a current-limit system built into the cam controller itself.

Automatic vehicle operation control systems must provide a smooth transition between the various programmed vehicle modes of operation in response to received electrical signals. For this reason the gradations of tractive effort for normal speed control must be effected in response to low level electrical signals which requires a different arrangement than that employed for prior operator-controlled systems. That is, the tractive effort must be varied in response to an applied electrical analog signal such as may be developed from a control system of the type described in the foregoing referenced patent application which calculates varying tractive efforts during the operation of the vehicles. Satisfactory operating conditions may, for example, require the field strength to be varied between 100% and a minimum of 33%, with consecutive intermediate steps of 70%, 50% and 40% of field strength.

The ready control of field strength is used for purposes other than speed regulation. For example, field weakening should be available for vehicle coasting, for additional dynamic braking steps, and for a low-torque first power position. Furthermore, the field weakening control system must include a current limit system which restrains progressive changes in motor field strength until the motor armature current decreases to a prescribed level. Moreover, in an automatic vehicle control system this must be provided in response to applied electrical signals.

It is thus one object of this invention to provide an improved motor field shunt contactor control system which can accurately and rapidly vary the motor field strength in prescribed, sequential steps.

It is an object of this invention to provide a field shunt contactor control system which can vary the tractive effort available from traction motors in response to electrical signals such as from an automatic vehicle control system.

It is another object of this invention to provide a tractive effort control system which can vary the tractive effort available from direct-current motors in response to an electrical analog computation signal.

It is still another object of this invention to provide a tractive effort control system which varies the field strength of traction motors in a prescribed sequence of steps from low level electrical signals thereby providing for the smooth operation of automatically controlled vehicles.

It is yet a further object of this invention to provide a static tractive effort control system responsive to low level electrical signals which prevents changes in tractive effort when traction motor armature current increases above a predetermined level.

Briefly stated, in accordance with one aspect of this invention, a system is provided for sequentially varying the field strength of a motor. The system includes means for coupling an electrical control signal to the system. It also includes means comprising a plurality of contractors each having first contact means and solenoid means. The contactors are adapted to be connected to field winding means of the motor for controllably shunting the field winding means. The system further includes a corresponding plurality of gate controlled conducting means, each having a gate electrode, and each connected between one of the solenoid means and a power source. Means are provided to couple the control cignal to the gate electrodes for firing the controlled conducting means in a predetermined sequence in response to a characteristic of the tractive effort signal to energize the solenoids in this sequence.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings, in which:

FIG. 1 is a schematic diagram of a series traction motor system having apparatus for changing the energization of the motor field windings;

FIG. 2 is a schematic diagram showing a motor shunt contactor control system designed in accordance with this invention;

Figure 3:
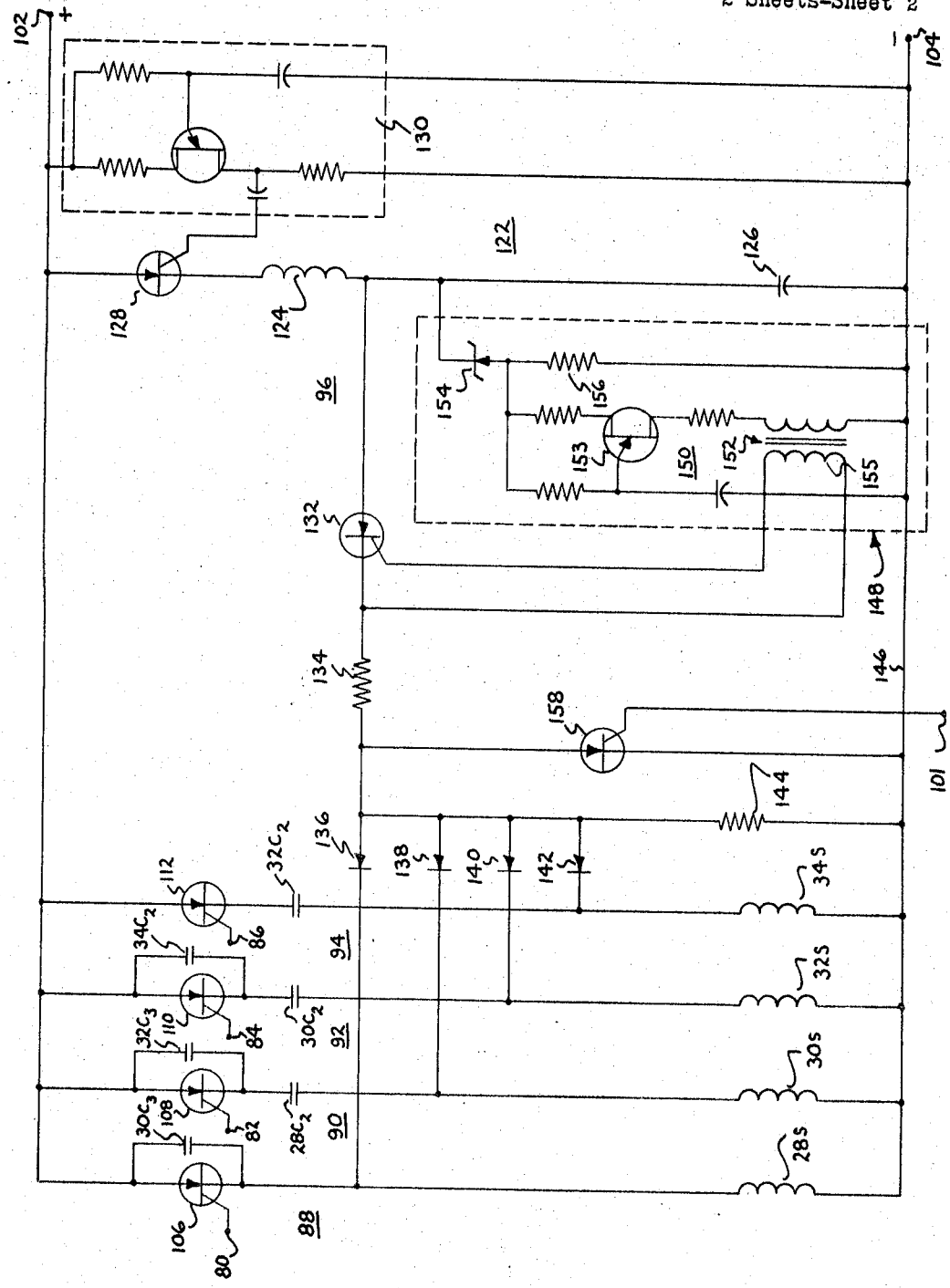
FIG. 3 shows one example of a power amplifier and commutation circuit which may be used in accordance with this invention.

This invention is generally useful for controlling the field strength of an electric motor with a series of field-strength changing steps in response to an electric analog signal. It has particular application in rapid transit or other railroad vehicle propulsion systems wherein fine gradations of tractive effort are required in response to low level electrical signals to provide for smooth, efficient operation of automatically controlled vehicles.

Referring to FIG. 1, a motor system is provided including means for controlling the field strength of a pair of direct current motors. This figure shows a portion of a typical direct current traction motor circuit for use in a railway vehicle propulsion system in which a pair of direct current traction motors 2 and 4, having series field windings 6 and 8, respectively, are coupled across terminals 10 and 12 of a direct current power source. A propulsion control means 14 in series with the armature circuit of the motor is arranged to control the torque of the motors in accordance with electrical control signals representing a required tractive effort applied thereto at the terminal 11. These control signals may be developed in accordance with the vehicle control system of the above-cited application, for example.

The means for controlling the motor field strength are shown, by way of example, as a resistive impedance element and a pluality of contactors connected across the terminals 12 and 16 to provide for selectively shunting portions of field windings 6 and 8. The resistive impedance element, generally indicated by the numeral 18, includes terminals 20, 22, 24, and 26 located at prescribed points along the impedance 18 having contacts 28C_1, 30C_1, 32C_1 and 34C_1 associated therewith; the closure of the various contacts being operative to shunt respective portions of impedance 18 thereby decreasing the field strength of the motors.

To decrease the field strength to 70% of the maximum available, for example, a contactor 28 may be energized to close the contacts 28C_1 to shunt a portion of the motor armature current through the impedance 18. To decrease the field strength even further, the contactors 30, 32 and 34 may be energized to close their corresponding contacts, thereby shunting the field windings 6 and 8 with a lesser portion of the impedance 18 to decrease the current flow through this field winding. The use of cam operated contactors to shunt portions of a resistance to vary field strength is well known and has been satisfactory for use in manually operated vehicles. Such cam-operated contactors are not suitable for use in automatically controlled vehicles, however.

In accordance with one embodiment of this invention, there is provided an arrangement for controlling the operation of the contactors, and hence the field strength, in response to low level electrical signals. As shown in FIGURE 2, the shunt contactor control system provides sequential energization of the contactors 28, 30, 32 and 34. The system is responsive to an analog tractive effort signal from a suitable source 38 which signal varies in magnitude with the desired changes in the tractive effort of the motors. Signal source 38 may be the source of braking and propulsion effort signals from an automatic vehicle control system such as that of the foregoing referenced patent application. The tractive effort signal from source 38 is coupled from a terminal 40 and bus 42 to circuit means 44 for generating a plurality of output voltages in response to the tractive effort signal.

The circuit means 44 includes a reference voltage source 46 and a plurality of comparison circuits comprising level comparators 48, 50, 52 and 54. The reference source 46 generates reference voltages which differ for each of the level comparators by a predetermined value corresponding to the voltage level of the traction effort signal at which the respective contactors are to be energized. For example, if contactor 28 is to be energized when the tractive effort signal level is two volts at a comparator input terminal 56, the reference voltage coupled from the source 64 to an input terminal 58 enables the level comparator 48 to generate an appropriate output signal at this voltage level. Also, if the contactor 30 is to be energized when the tractive effort signal level at an input terminal 60 is four volts, the reference voltage coupled to an input terminal 62 enables the level comparator 50 to generate an output voltage at this tractive effort signal level. Similarly, the reference voltages coupled to input terminals 64 and 66 are such as to enable the comparators 52 and 54 to generate output signals when the tractive effort signals at input terminals 68 and 70 are at appropriate magnitudes.

The output signals from each of the level comparators are amplified and applied to a power amplifier circuit which energizes the contactors. The output signals from the comparators 48, 50, 52 and 54 are coupled through amplifiers 72, 74, 76 and 78, respectively, to the input terminals 80, 82, 84, 86, of power amplifiers 88, 90, 92, and 94.

Where the field shunt contactor circuit controls direct current motors, the power amplifiers comprise gate controlled conducting devices energized by a direct-current source. Devices of this type when associated with a direct current supply require commutating circuits to periodically de-energize the controlled conducting devices to enable the tractive effort signal to maintain control over the energization of the contactors. In the present system a free running commutation circuit 96 provides this function. It may be a circuit of the type which periodically couples electrical energy to the power amplifiers to cause their controlled conducting devices to become nonconducting.

The shunt contactor control system can operate in a "current limiting" mode of operation in which contactors are energized in response to an increase in armature current and contactors which are already energized remain energized. To perform this function, a circuit 98 senses the armature current level. Signals indicative of the current level are coupled to a lockout circuit 100. The lockout circuit performs two functions. First it couples a signal to the reference voltage source 46 to change the reference voltages in such a manner that the level comparators are prevented from generating output signals regardless of the magnitude of the tractive effort signals. Secondly, it couples signals to an input terminal 101 to prevent the commutating circuit 96 from deenergizing the contactors which are already energized. These functions are performed until the armature current level decreases below the predetermined level.

During the normal operation of an automatic vehicle control system, tractive effort control signals from source 38 are coupled through the terminal 40 to the various level comparators each of which generates output signals when the tractive effort signal is above a prescribed level. Using the comparator 48 as an example, its output signals are amplified by the amplifier 72 and coupled to the power amplifier 88. The signals render the controlled conducting device within the power amplifier 88 conductive to thereby energize the contactor 28 causing contact $28C_1$ thereof to close. The commutation circuit 96 periodically turns off the controlled conducting device in the power amplifier 88. If the tractive effort signal level is still high enough, the output signals from the comparator 48 quickly "refire" the controlled conducting device in the power amplifier 88. Due to the inductive nature of the solenoid in contactor 28, its temporary de-energization does not open the contact $28C_1$. In a similar manner, the contactors 30, 32 and 34 are sequentially energized as the tractive effort signal level increases.

As the tractive effort signal level decreases, the contactors are sequentially de-energized. For example, should the signal level at the input terminal 70 decrease below a predetermined level, the comparator 54 does not generate output signals. The next time that the commutation circuit 96 turns off the controlled conducting device in the power amplifier 94, it remains turned off. The contactor 34 is thus de-energized, opening the contact $34C_1$. The remaining contactors are de-energized in a similar manner.

FIG. 3 shows one example of power amplifier and commutation circuits which may be used in accordance with the principles of this invention. The power amplifiers include gate controlled conducting devices which are coupled across a direct-current power supply at terminals 102 and 104. The power amplifiers 88, 90, 92 and 94 comprise controlled conducting devices 106, 108, 110 and 112, respectively, shown herein as silicon controlled rectifiers.

The power amplifiers further include means for insuring that the solenoids are energized in the predetermined sequence and that they are de-energized in the reverse of this sequence. Each of the contactors except contactor 34, the last to be energized, has a set of normally open interlock contacts connected in series with the solenoid of the next to be energized contactor. Thus the solenoids 30S, 32S and 34S have contacts $28C_2$, $30C_2$ and $32C_2$, respectively, connected in series therewith to insure that these solenoids are not energized out of turn. Each of the contactors, except contactor 28, the first to be energized, has a pair of normally open contacts connected across the controlled rectifier device which couples energy to the previously energized solenoid in the sequence. The contacts $34C_3$, $32C_3$ and $30C_3$ are connected across the silicon controlled rectifiers 110, 108 and 106 respectively. Thus the solenoids in series with these controlled rectifiers can not be de-energized out of sequence.

FIG. 3 also shows a commutating circuit comprising a series resonant circuit which generates a voltage which when coupled to the controlled conducting devices in the power amplifiers causes them to stop conducting. A series resonant circuit 122 includes an inductance 124 and a capacitance 126. This resonant circuit is coupled to the terminal 102 by a silicon controlled rectifier 128. The gate electrode of the controlled rectifier 128 is energized by a driving circuit 130. The driving circuit 130, comprising by way of example a well-known unijunction transistor relaxation oscillator, allows a predetermined time to elapse between the discharging of the capacitor 126, and its subsequent charging.

After the capacitor 126 is charged to a pre-established voltage level, it is coupled to the silicon controlled rectifiers in the power amplifiers to reverse bias them. The capacitor 126 is coupled through a silicon controlled rectifier 132, a resistor 134 and from anode to cathode of the diodes 136, 138, 140 and 142, to the cathodes of the silicon controlled rectifiers 106, 108, 110 and 112, respectively. The anodes of diodes 136, 138, 140 and 142 are coupled through a resistor 144 and through a common bus 146 to the negative terminal 104. These diodes also act as "free wheeling" diodes for the solenoids coupled to the power amplifiers. The value of the total impedance of the resistors 134 and 144 multiplied by the holding current level of the controlled rectifier 132 must be small. Thus, little or no residual voltage remains across the capacitor 126 after it commutates the controlled rectifiers in the power amplifiers.

The controlled rectifier 132 is fired by a second driving circuit 148 arranged so that the commutation period of the commutation circuit can be changed without changing the energy storage capacitor of the resonant circuit. The second driving circuit 148 includes, by way of example, a unijunction relaxation oscillator 150 having the primary winding of a pulse transformer 152 coupled between the base-one electrode of a unijunction transistor 153 and the common bus 146. The secondary winding 155 of this transformer is coupled to the gate circuit of the controlled rectifier 132. The timing cycle of the relaxation oscillator 150 is initiated when the voltage at the capacitor 126 coupled through a resistor 156 reaches the breakdown voltage level of a breakdown diode 154. To change the commutation period of the commutating circuit 96, the second driving circuit 148 may be replaced with another having a longer or shorter timing period.

During the operation of the circuit shown in FIG. 3, a firing pulse at the terminal 80 in the gate circuit of the controlled rectifier 106 fires this controlled rectifier. The solenoid 28S is energized by the power source at the terminals 102 and 104 which closes contacts $28C_2$. When pulses are subsequently coupled to the input terminal 82, they fire the controlled rectifier 108 to energize the solenoid 30S which closes the contacts $30C_2$. The controlled rectifiers 110 and 112 can be fired in a similar manner in the predetermined sequence. However, none of these controlled rectifiers can be fired out of the sequence because of the normally open interlock contacts connected in series with it.

Assuming that each of the controlled rectifiers in the power amplifiers has been fired, they must be turned off in the reverse of the order in which they were fired. As long as the controlled rectifier 112 is conducting to keep the solenoid 34S energized, the contacts $34C_2$ shunt the controlled rectifier 110. If for some reason controlled rectifier 110 is turned off current still flows through the contacts $34C_2$ to energize the solenoid 32S. In a similar manner the contacts $32C_3$ and $30C_3$ keep the solenoids 30S and 28S, respectively, energized.

In the commutating portion of the circuit hown in FIG. 3, the driving circuit 130 provides a time delay between the eventual discharge of the capacitor 126 and the beginning of the next charging cycle of this capacitor. This prevents an overlap of the charging and discharging portions of the commutating cycle which might prevent the controlled rectifier 132 from turning off. After the controlled rectifier 128 has been fired by the driving circuit 130, the capacitor 126 charges through the inductor 124. When the capacitor voltage exceeds the breakdown voltage of diode 154, the relaxation oscillator 150 is energized to fire unijunction transistor 153 and a pulse is coupled therefrom through the transformer 152 to fire the controlled rectifier 132. The capacitor voltage, which is greater than the supply voltage at the terminals 102 ant 104 due to the resonant nature of the circuit 122 is coupled to the cathodes of the controlled rectifiers 106, 108, 110 and 112 through controlled rectifier 132. Controlled rectifiers 106, 108, 110 and 112 are now back biased and turn off sequentially as described above. If there are no firing pulses at the gate electrodes these controlled rectifiers thereafter remain turned off after the capacitor voltage has discharged through the resistors 134 and 144.

The commutating circuit can be prevented from coupling energy to the controlled rectifiers in the power amplifier. For example, should the armature current in a traction motor system become too large, the lockout circuit 110 in FIG. 2 couples a pulse to the terminal 101 to fire the controlled rectifier 158. This controlled rectifier then shunts the energy from the capacitor 126 and prevents it from rendering the controlled rectifiers in the power amplifier circuits conductive.

This invention is not limited to the particular details of the preferred embodiments illustrated. It is contemplated that various modifications and applications within the scope of this invention will occur to those skilled in the art. It is therefore intended that the appended claims cover such modifications which do not depart from the direct spirit and scope of this invention.

What I claim as new and desire to secure by Letters Patent of the United States is:

1. A tractive effort control system operative in response to received tractive effort signals comprising, in combination:
   (a) traction motor means having field winding means;
   (b) means, including a plurality of contactors each having an operating winding and contact means, connected to said field winding means for controllably shunting said field winding means;
   (c) a reference signal source for generating a corresponding plurality of reference signals which differ by predetermined values at a corresponding plurality of terminals;
   (d) a corresponding plurality of comparison circuits each having first and second input terminals, said comparison circuits generating an output voltage as a function of the difference in the signals at said input terminals, means for applying said tractive effort signals in common to each of said first input terminals, means for applying a different reference signal to each of said second input terminals;
   (e) a corresponding plurality of controlled conducting means each having a gate electrode, one of said controlled conducting means arranged between the operating winding of each of said contactors and a power source;
   (f) means for connecting the output of each of said comparison circuits to a separate gate electrode to fire said controlled conducting means in a sequence determined by the different values of the reference signals as the tractive effort signal varies;
   (g) a power source connected to said operating winding comprises a direct-current power source;
   (h) a source of energy for commutating said controlled conducting means;
   (i) means for periodically coupling said source of energy to said controlled conducting means to effect such commutation;
   (j) means connected to said source of energy and controllable to shunt the energy away from said controlled conducting means when said controlled means are not to be commutated.

2. A tractive effort control system according to claim 1, wherein said contactors except the last to be energized in the sequence also include second, normally open contact means, said contactors except the first to be energized in the sequence also include third normally open contact means, means for connecting said second contact means of said contactors in series with the next to be energized contactor operating winding in the sequence, and means for connecting said third contact means of each of said contactors across the controlled conducting means connected to the contactor operating winding to be denergized next in the reverse of the sequence.

3. A system for controlling the tractive effort of traction motor means in accordance with received tractive effort signals by varying the field energization of the motor field windings comprising, in combination:
   (a) means, including a chosen plurality of contactors comprising first contact means and solenoid means, connected to the motor field windings for controllably shunting the field windings;
   (b) a corresponding plurality of gate controlled conducting means each having a gate electrode, means for connecting each of said solenoid means between a power source and the one of said controlled conducting means;
   (c) means connected to said tractive effort signals and to said gate electrodes for firing said controlled conducting means in a predetermined sequence in response to the magnitude of the tractive effect signal to energize said solenoids in the sequence;
   (d) said contactors except the last to be energized in the sequence also including second normally open contact means, said contactors except the first to be energized in the sequence also including third normally open contact means; means for connecting said second contact means of each contactor in series with the next solenoid means to be energized in the sequence, and means for connecting said third contact means of each of said contactors across the controlled conducting means corresponding to the solenoid means to be de-energized next in the reverse of the sequence.

4. A control system according to claim 3 wherein the power source connected to said solenoid means comprises a direct-current power source, said system further including a series resonant circuit for generating energy for commutating said controlled conducting means, and means for periodically coupling said series resonant circuit to said controlled conducting means.

5. A system according to claim 4 wherein said means for periodically coupling said resonant circuit to said controlled conducting means comprises:
   (a) a controlled conducting device having a gate a electrode; and
   (b) a voltage sensitive driving circuit connected between said series resonant circuit and said gate electrode of the last mentioned controlled conducting device and responsive to the voltage developed by said series resonant circuit to fire said last mentioned controlled conducting device.

6. A system for varying the tractive effort of traction motor means having field winding means in response to received tractive efforts signals comprising, in combination:
   (a) a plurality of contactors each comprising first contact means and solenoid means;
   (b) resistive impedance means connected across the field winding means, means for connecting said first contact means to said resistive impedance means to change the energization level of the field winding means when said solenoid means are energized;
   (c) a reference voltage source having a corresponding plurality of reference terminals, said reference source generating a corresponding plurality of reference voltages which differ by predetermined values;
   (d) a corresponding plurality of comparison circuits each having first and second input terminals, said comparison circuits generatinng an output voltage as a function of the difference in the levels at said input terminals; means for connecting the output of the regulator to each of said first input terminals, means for connecting a separate reference terminal to each of said second input terminals;

(e) a corresponding plurality of power amplifiers each having an amplifier input terminal, means for connecting one of said solenoid means to each of said power amplifiers;

(f) means for connecting the output of each of said comparison circuits to a separate amplifier input terminal to cause said power amplifiers to energize said solenoids in a sequence determined by the different values of the reference signals and to de-energize said solenoids in the inverse of this sequence as the traction effort signal varies;

(g) means for sensing the motor current level of said traction motor means;

(h) lock-out circuit means connected between said current sensing means and said reference source and controllable in response to the motor current level to change the reference voltages so that those solenoids already energized remain energized but those not energized cannot be energized regardless of the level of the tractive effort signal when the magnitude of the motor current is above a predetermined level.

7. A tractive effort control system according to claim 6 wherein said contactors except the last to be energized in the sequence also include second, normally open contact means, said contactors except the first to be energized in the sequence also include third normally open contact means, means for connecting said second contact means of said contactors in series with the next solenoid means to be energized in the sequence, and means for connecting said third contact means of each of said contactors across the controlled conducting means connected to the solenoid to be de-energized next in the reverse of the sequence.

References Cited

UNITED STATES PATENTS

| | | | |
|---|---|---|---|
| 3,193,698 | 7/1965 | Henderson et al. | 318—534 X |
| 3,230,438 | 1/1966 | Bracutt | 318—533 X |

ORIS L. RADER, Primary Examiner

H. HUBERFELD, Assistant Examiner

U.S. Cl. X.R.

318—356, 369, 381, 395